United States Patent
Muirhead (10) Patent No.: US 10,252,803 B2
(45) Date of Patent: Apr. 9, 2019

(54) SECURING SYSTEM, RETAINING DEVICE AND PORTABLE MOUNTING ADAPTER FOR PASSENGER APPLIANCES IN AN AIRCRAFT

(71) Applicant: LUFTHANSA TECHNIK AG, Hamburg (DE)

(72) Inventor: Andrew Muirhead, Norderstedt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 267 days.

(21) Appl. No.: 14/432,354

(22) PCT Filed: Sep. 26, 2013

(86) PCT No.: PCT/EP2013/070110
§ 371 (c)(1),
(2) Date: Mar. 30, 2015

(87) PCT Pub. No.: WO2014/049072
PCT Pub. Date: Apr. 3, 2014

(65) Prior Publication Data
US 2015/0329209 A1 Nov. 19, 2015

(30) Foreign Application Priority Data
Sep. 28, 2012 (DE) .................. 10 2012 217 802

(51) Int. Cl.
*B60R 7/00* (2006.01)
*B60R 11/02* (2006.01)
(Continued)

(52) U.S. Cl.
CPC .... *B64D 11/00152* (2014.12); *B64D 11/0015* (2013.01); *B64D 11/06* (2013.01);
(Continued)

(58) Field of Classification Search
CPC .......... B64D 11/00152; B64D 11/0015; B64D 11/0624; B60R 7/043; B60R 7/06;
(Continued)

(56) References Cited

U.S. PATENT DOCUMENTS 7,352,567 B2 * 4/2008 Hotelling .............. G06F 1/1632
312/223.2
7,737,845 B2 * 6/2010 Fawcett ............. G07C 9/00309
340/5.25
(Continued)

FOREIGN PATENT DOCUMENTS

EP        1 973 299      9/2008
WO    WO-2011/034441     3/2011
(Continued)

OTHER PUBLICATIONS

Examination Report from German Patent Office for Application No. 10 2012 217 802.3, dated Jun. 14, 2018, pp. 1-5.

*Primary Examiner* — Justin Larson
(74) *Attorney, Agent, or Firm* — Saliwanchik, Lloyd & Eisenschenk (57) ABSTRACT

The invention concerns a securing system for passenger appliances in an aircraft, the securing system comprising a retaining device which can be mounted on or in an aircraft seat. The retaining device comprises a connection device, the connection device being displaceable between a park position and a use position. The securing system has a portable mounting adapter, the mounting adapter having a connection arrangement, and the connection device and the connection arrangement being detachably and mechanically connectable to each other in load-bearing manner. The mounting adapter is arranged to be connected to the passenger appliance in load-bearing manner.

18 Claims, 6 Drawing Sheets

(51) Int. Cl.
*B64D 11/06* (2006.01)
*E05B 73/00* (2006.01)
*B64D 11/00* (2006.01)
*B60R 11/00* (2006.01)
*B60R 7/04* (2006.01)

(52) U.S. Cl.
CPC .......... *B64D 11/0624* (2014.12); *B60R 7/043* (2013.01); *B60R 11/0241* (2013.01); *B60R 11/0252* (2013.01); *B60R 2011/0015* (2013.01); *B60R 2011/0082* (2013.01); *B60R 2011/0098* (2013.01); *E05B 73/0017* (2013.01)

(58) Field of Classification Search
CPC ................ B60R 2011/0012–2011/0017; B60R 2011/0082; B60R 2011/0096; B60R 2011/0098; B60R 11/0241; B60R 11/0252; E05B 73/0082; E05B 73/0017
See application file for complete search history.

(56) References Cited

U.S. PATENT DOCUMENTS

| | | | |
|---|---|---|---|
| 8,376,457 B2 | 2/2013 | Muirhead | |
| 8,432,262 B2* | 4/2013 | Talty | G06K 7/10237 340/10.51 |
| 8,814,128 B2* | 8/2014 | Trinh | A47F 7/024 248/187.1 |
| 8,860,574 B2* | 10/2014 | Grant | E05B 47/026 109/51 |
| 9,045,096 B2* | 6/2015 | Procter | B60R 11/0235 |
| 9,758,248 B2* | 9/2017 | Procter | B60R 11/0235 |
| 2005/0127122 A1 | 6/2005 | McKenzie et al. | |
| 2006/0066438 A1* | 3/2006 | Altounian | G06F 21/86 340/5.53 |
| 2006/0219857 A1 | 10/2006 | Satterfield | |
| 2007/0174907 A1* | 7/2007 | Davis | G06Q 20/327 726/9 |
| 2008/0023600 A1 | 1/2008 | Perlman | |
| 2009/0090821 A1 | 4/2009 | Kim et al. | |
| 2010/0060050 A1* | 3/2010 | Muirhead | B64D 11/00152 297/217.4 |
| 2010/0147041 A1* | 6/2010 | Teicher | E05B 73/0005 70/58 |
| 2011/0278885 A1* | 11/2011 | Procter | B60R 11/0235 297/135 |
| 2012/0047972 A1* | 3/2012 | Grant | A47F 3/002 70/77 |
| 2012/0175474 A1* | 7/2012 | Barnard | F16M 11/041 248/122.1 |
| 2012/0241572 A1* | 9/2012 | McClain | B60N 3/004 248/220.21 |
| 2012/0326578 A1* | 12/2012 | Wilson | A45C 11/00 312/223.1 |
| 2013/0026322 A1* | 1/2013 | Wheeler | A47F 7/024 248/289.31 |
| 2013/0072258 A1* | 3/2013 | Levionnais | H04M 1/04 455/558 |
| 2013/0298616 A1* | 11/2013 | Ullrich | E05B 47/0012 70/278.1 |
| 2014/0000322 A1* | 1/2014 | Williams | E05B 73/0011 70/18 |
| 2014/0118930 A1* | 5/2014 | Sedon | E05B 73/0082 361/679.56 |

FOREIGN PATENT DOCUMENTS

| | | |
|---|---|---|
| WO | WO-2011/092348 | 8/2011 |
| WO | WO-2011/143648 | 11/2011 |
| WO | WO-2012/082071 | 6/2012 |

\* cited by examiner

SECURING SYSTEM, RETAINING DEVICE AND PORTABLE MOUNTING ADAPTER FOR PASSENGER APPLIANCES IN AN AIRCRAFT

CROSS-REFERENCE TO RELATED APPLICATIONS

The present application is the U.S. National Stage Application of International Patent Application No. PCT/EP2013/070110, filed on Sep. 26, 2013, which claims priority to German Patent Application No. 10 2012 217 802.3, filed on Sep. 28, 2012, both of which are hereby incorporated by reference herein in their entirety, including any figures, tables, or drawings.

The invention relates to a fastening system, a holding apparatus and a portable carrier adapter for passenger devices in an airplane.

Passenger devices may include cellular phones, portable computers, entertainment devices and/or any mixed form of these types of devices, such as smart phones or tablet PCs, for example. The passenger devices are brought onto the airplane by the passengers on a flight and can be used by the passengers there. Exceptions for such use include, due to aeronautical regulations, the critical flight phases of, for example, taxiing, taking off or landing, during which the use of passenger devices is allowed only to a restricted extent.

The passenger devices are used by the passengers during flight for entertainment or for work. In the cabin of an airplane, it is hardly possible for the airline to provide a corresponding device for each passenger to use instead of his own personal passenger device because passenger devices contain personal information and programs, for example, so that the passengers' own devices are better adapted to the individual needs of the respective passenger. In addition, the product cycles for mobile electronic devices are comparatively short, so that the equipment in the cabin of an airplane with the corresponding terminals for the passenger can necessarily be accomplished only with a time lag because of the longer development cycles in aviation.

Therefore, because of the increasing popularity and functionality of passenger devices such as smartphones and tablet PCs, these devices are increasingly being used during flights.

One disadvantage for effective use of passenger devices by a passenger in a cabin of an airplane is the constricted space available for the passenger. Because of economic factors, the seating in the cabins is relatively narrow, so that only a limited storage space is available for use by the passenger. Each passenger typically has a folding table, but this is suitable only for simultaneous use of the passenger device to a limited extent, in particular when meals are being served by the service personnel.

A constantly growing variety of different device models and types of devices stands in the way of a fastening system for passenger devices, so that fastening systems have so far been tailored only for individual passenger device models.

Fastening systems for passenger devices, in particular in the area in front of the passenger's head, are desired by passengers to permit a good field of view of the passenger device. However, this would be in conflict with passenger safety in the event of a crash because in such a case, the passenger's head could come in contact with or collide with objects in front of the passenger, which is applicable in particular to the passenger's direct field of view. This is a problem in the conventional row seating in airplanes with limited distance from the backrest of the airplane seat in front, because in the event of a crash, a fastening system arranged in this position might injure the passenger's head, arms and/or torso as a result of impact.

The object of the invention is to provide a fastening system, a holding apparatus and a portable carrier adapter for a passenger device, which overcomes the aforementioned disadvantages.

The object of the invention is achieved starting from the preamble of claim 1 with its characterizing features. A fastening system, which according to the present invention has a holding apparatus to be mounted on or in an airplane seat, is proposed, wherein the holding apparatus comprises a connecting apparatus. The fastening system has a portable carrier adapter, wherein the carrier adapter has a connecting device, wherein the connecting apparatus is displaceable between a park position and a use position. The connecting apparatus and the connecting device are releasably connectable to one another, so that they are mechanically load bearing, and the carrier adapter is equipped to be connected to the passenger device in a load-bearing manner.

The holding apparatus can be mounted on the airplane seat or integrated into the seat, establishing the connection between the airplane seat and the connecting apparatus. The connecting apparatus may have a mechanical coupling to a connecting device of a carrier adapter. The carrier adapter may be an adapter, which is adapted to a certain passenger device, but the connecting device may be designed independently of the respective passenger device. The releasable connection between the connecting device of the carrier adapter and the connecting apparatus of the holding apparatus permits advantageous fastening and placement of the passenger device on or in an airplane seat within the field of view of the passenger, so that the passenger device can be arranged for use in a cantilevered manner within the range of the passenger. This permits advantageous use by the passenger without having to hold the passenger device in his hand or rest it on his lap or on a folding table, so that effective use is made possible even in a constricted space.

In addition, individual adaptation to a wide variety of types of passenger devices is possible by using a carrier adapter which can be designed very inexpensively. The carrier adapter may advantageously be reused for additional flights, so that in principle the carrier adapter can have the same service life as the passenger device itself. Furthermore, the carrier adapter can be carried by the passenger along with the passenger device on his trip.

The fastening system is advantageously suitable for screen-controlled passenger devices, in particular devices having a touch-sensitive screen. In addition, the fastening system in a typical cabin seating permits effective and simultaneous use of the passenger device and the consumption of meals and beverages on airplanes. The passenger device can still be removable by the passenger at any time, so that hand-guided use of the passenger device remains possible. The carrier adapter is advantageously designed accordingly, so that it does not interfere with hand-guided use. The load-bearing connection of the passenger device by means of the carrier adapter preferably takes place directly, but indirect load-bearing connections by means of a mediating part, for example, a protective sleeve for the passenger device, are also possible.

In critical flight phases such as taxiing, takeoff, approach and landing, during which operation of passenger devices is not allowed because of aeronautical regulations, the connecting apparatus can be changed from the use position to the park position, wherein the park position does not allow fastening of a carrier adapter, so that no passenger device can be fastened in the park position by means of the fastening system. The park position is specifically designed for the event of a crash, so that, in the event of a crash, the passenger is not endangered by the fastening system. This is possible because the actual functionalities of the fastening system are not available in the park position. The carrier adapter and the passenger device, the operation of which is allowed only to a restricted extent or not at all during the critical flight phase, are therefore stowed with the passenger's additional bags, for example, for this purpose. Therefore, the fastening system with the connecting device in the park position does not in any way result in compromising the safety of the passenger who is in the immediate vicinity of the holding apparatus, so that during accelerations out of a crash situation, for example, up to 16 g's, there is no increased risk of injury for the passenger. Furthermore, the displaceability of the connecting apparatus between a use position and a park position makes it possible to stow the connecting apparatus if its use by the passenger is not desired or the connecting apparatus of the holding apparatus would interfere with the passenger when he stands up.

The connecting apparatus is preferably recessed in the airplane seat in the park position. Recessing the connecting apparatus in the park position in the holding apparatus permits a flat planar surface, which is advantageous in an arrangement of the holding apparatus in the backrest of an airplane seat in particular, wherein the holding apparatus is provided for the passenger seated behind the seat in order not to have any exposed locations. The potential for injury in the event of a crash is minimized by the planar flat surface in the park position. Excessive point loads, cut wounds or penetration of parts of the holding apparatus into the passenger's body in the event of a crash can thus be prevented. When recessed, the connecting apparatus is preferably moved into the holding apparatus at a right angle to the surface of the holding apparatus facing the passenger. In the recessed state in the park position of the connecting apparatus, it is advantageous if the connecting apparatus and the holding apparatus form an essentially planar surface.

The carrier adapter is preferably rotatable with respect to the holding apparatus, preferably by at least 90°, also preferably by 180° and/or can be tilted about at least one axis, preferably by at least 5°, also preferably by 20°, when the connecting apparatus and the connecting device are connected to one another mechanically in the use position. Furthermore, preferably at least one rotational position of the carrier adapter relative to the holding apparatus can be locked in place and/or preferably has a catch position in at least one rotational position.

The rotatability of the carrier adapter advantageously permits various orientations of a display screen of the passenger device, so that the display screen can be oriented crosswise or upright for effective use. Therefore, the fastened passenger device can be rotated by the passenger into the corresponding orientation. In addition, tiltability of the carrier adapter with respect to the holding apparatus is advantageous to permit an adapted orientation of the passenger device relative to the passenger, in particular relative to the passenger's head. The orientation may thus be based on the physical conditions, habits and seat position of the passenger. Furthermore, a variable orientation is advantageous in particular when the position of the backrest of the airplane seat, for example, the front seat on which the carrier adapter is mounted, is adjusted, so that it is possible for the passenger using the device to make an adjustment.

In addition, a releasable locking device which acts between the connecting apparatus and the connecting device is preferably provided. The locking device may prevent unintentional release of the carrier adapter from the holding apparatus when the airplane is experiencing accelerations in various directions due to flight maneuvers and/or turbulence that could accidentally release the mechanical connection between the connecting apparatus and the connecting device. This can prevent injuries to the passenger and/or damage to the passenger device. In addition, it can prevent unintentional release upon rotation of the carrier adapter.

Such a locking device may be, for example, a ball bearing locking mechanism, i.e., for example, a spring-mounted and/or rotatably mounted ball, or a mechanical locking mechanism, having a spring-mounted locking part in particular. One part of the locking device, for example, the spring-mounted and/or rotatable ball, may be arranged in the connecting apparatus. A corresponding part of the locking device as a counterpart may be provided, for example, in the form of a depression in the connecting device of the carrier adapter.

In a possible advantageous embodiment, the mechanical connection between the connecting device and the connecting apparatus can be released exclusively by an extraction tool. The carrier adapter can be provided by the airline company, for example; in this case, it is advantageous if the passenger himself cannot release the carrier adapter without extraction tool from the holding apparatus. The cabin crew and/or service personnel can therefore release the mechanical connection between the connecting device and the connecting apparatus by using an extraction tool and can then retrieve the carrier adapter.

The same thing is also true of the possibility when an electronic device of the airline company is integrated directly into the carrier adapter and/or is connected permanently to it and this device is made available to the passenger for use during the flight. This is advantageous in particular if the electronic device is made available to the passenger by the airline company, so that rapid replacement of devices and variable usage are made possible.

In a possible embodiment, the carrier adapter with an electronic device may remain fastened to the holding apparatus even in critical flight phases according to the corresponding safety requirements.

In an advantageous alternative embodiment, the mechanical connection between the connecting device and the connecting apparatus can be released in an electronically controlled manner. Therefore, the mechanical connection between the connecting device and the connecting apparatus can be released or enabled in a centrally controlled manner in the cabin for multiple holding apparatuses. A desired position can preferably be controlled centrally, so that the connecting apparatus in the cabin can be moved into this position, for example, the park position, but cannot be moved back out of it. In a possible embodiment, the prevailing locking status can be detected electronically, so that the service personnel in particular can check centrally on whether all the connecting apparatuses are in the park position. In addition, the electronic control makes it possible to omit the need for a mechanical extraction tool. In a possible embodiment, a mechanical extraction tool can be used in parallel.

The holding apparatus of the fastening system preferably has an RFID reader and/or an NFC reader. This reader is assigned directly to one holding apparatus and may be used to control various functions and to acquire information, in particular information based on the holding apparatus.

In a preferred embodiment, the mechanical connection between the connecting device and the connecting apparatus can be opened and/or closed in an electronically controlled manner by means of the reader. This permits a simple and convenient way to secure the mechanical connection between the connecting device and the connecting apparatus or unlock this connection for releasing it. The service personnel may use a suitably coded RFID card for this purpose, for example.

In addition, the object of the invention is achieved starting from the preamble of claim 9 with its characterizing features. A holding apparatus for passenger devices in an airplane is proposed, wherein the holding apparatus is equipped, according to the invention, for being mounted on or in an airplane seat, wherein the holding apparatus comprises a connecting apparatus, wherein the connecting apparatus is displaceable between a park position and a use position. The connecting apparatus and a connecting device of a portable carrier adapter, which is equipped for being connected to the passenger device in a load-bearing manner, are releasably connectable to one another in a load-bearing manner.

The connecting apparatus is preferably displaceable between a park position and a use position. The connecting apparatus is preferably recessed when in the park position. Also, the connecting apparatus is preferably recessed in the holding apparatus when in the park position.

In a preferred embodiment, the connecting apparatus has a protrusion at the end, which enables an advantageous attachment of a carrier adapter. Furthermore, the protrusion at the end can be used by the passenger to extract the connecting apparatus from the park position into a use position. The protrusion at the end may also be used, in the case of nonuse of a connecting device of a carrier adapter, to hang bags, jackets or other things on the holding apparatus.

In a possible embodiment, the holding apparatus is arranged on an armrest of the airplane seat. This may be advantageous to permit fastening of passenger devices for this seat in the case of seats in the airplane without an associated front seat or in the case of large distances between the seats. Because of the arrangement at the side, a tray, for example, may be usable advantageously at the same time.

The holding apparatus advantageously has a holding arm, which is connected to the airplane seat at one end, and at its other end, the connecting apparatus is attached.

The holding arm permits an advantageous positioning of the holding arm in the field of view of the passenger so that ergonomic operation of the passenger device is made possible for this passenger. In a preferred embodiment, the holding arm is foldable, which permits a large positioning area and individual positioning by the passenger.

The holding apparatus is preferably arranged on a rear side of an airplane seat. In an advantageous embodiment, the holding apparatus can be recessed into the backrest for this purpose, so that a closed shape is possible for the backrest, which may be advantageous for safety and aesthetic impression.

In a possible advantageous embodiment, the connecting apparatus is integrated into a locking latch of a folding table. Folding tables which are arranged on the rear side of a front seat are typically used in airplane cabins. The locking latch is typically located on the seat and above the table surface when folded up, and it unlocks the folding table by means of a 90° turn. The locking latch is situated at an advantageous height and distance from the passenger, so that it is advantageous to integrate a connecting apparatus into the locking latch. A turn mechanism of the locking latch can be used advantageously for a rotation of a connected passenger device.

In addition, the object of the invention is achieved starting from the preamble of claim 16 with its characterizing features. A portable carrier adapter for passenger devices in an airplane has a connecting device according to the invention and the carrier adapter is equipped to be connected to the passenger device in a load-bearing manner. The connecting device and a connecting apparatus of a holding apparatus, which is equipped for connection to or in an airplane seat, can be connected releasably to one another, so that they are mechanically load bearing.

An adhesive is preferably provided on the carrier adapter, wherein the adhesive can be connected to one side of a mobile passenger device or, for example, to a protective sleeve for such a device. In this way, a very small, lightweight and inexpensive carrier adapter can be made possible, which can be utilized for a plurality of passenger devices inasmuch as the passenger device has a relatively flat and smooth rear side. For example, the adhesive may be arranged on the carrier adapter as a pull-away strip and/or adhesive strip. Such a carrier adapter can also be kept on hand easily in the cabin of an airplane and glued to the passenger device itself or to a protective sleeve or shell for a passenger device.

In one embodiment, a connecting element for connection to a housing shell for a mobile passenger device may be provided on the carrier adapter. A clip connection may be used advantageously as the connecting element, wherein the housing shell has a corresponding connection point. In a preferred embodiment, the housing shell has a plurality of positioning options for the connecting element through various connection points. This may be used, for example, on tablet PCs for positioning and/or orientation of the device in relation to the holding apparatus.

In another embodiment, the carrier adapter has a shell, in which a mobile passenger device can be accommodated. The passenger device can be enclosed on several sides, so that advantages are obtained with regard to the fastening of the passenger device in the carrier adapter. The passenger device still remains operable in the carrier adapter, and at the same time, the carrier adapter can offer mechanical protection for the passenger device.

The carrier adapter preferably includes a roll-up area for at least one cable. The roll-up area may accommodate a cable for connection of the passenger device to a power source and/or a data link, and in possible embodiments, it can also roll up and unroll the cable in a spring-loaded manner. A corresponding cable can be stored in the passenger device in this way and can be packaged or stored efficiently and in space-saving manner in the roll-up area. One end of the cable may have a plug that is integrated into the carrier adapter, so that this plug can be plugged into the passenger device in a predetermined manner when the passenger device is connected to the carrier adapter in a load-bearing manner.

The invention will now be explained below on the basis of preferred embodiments with reference to the accompanying figures, in which.

Figure 1:
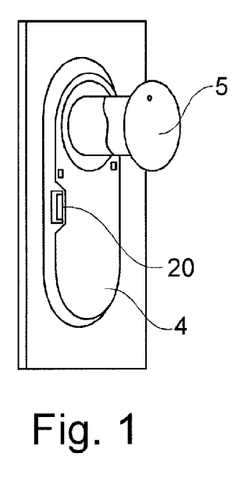
FIG. 1 shows a holding apparatus having a connecting apparatus.
Figure 8:
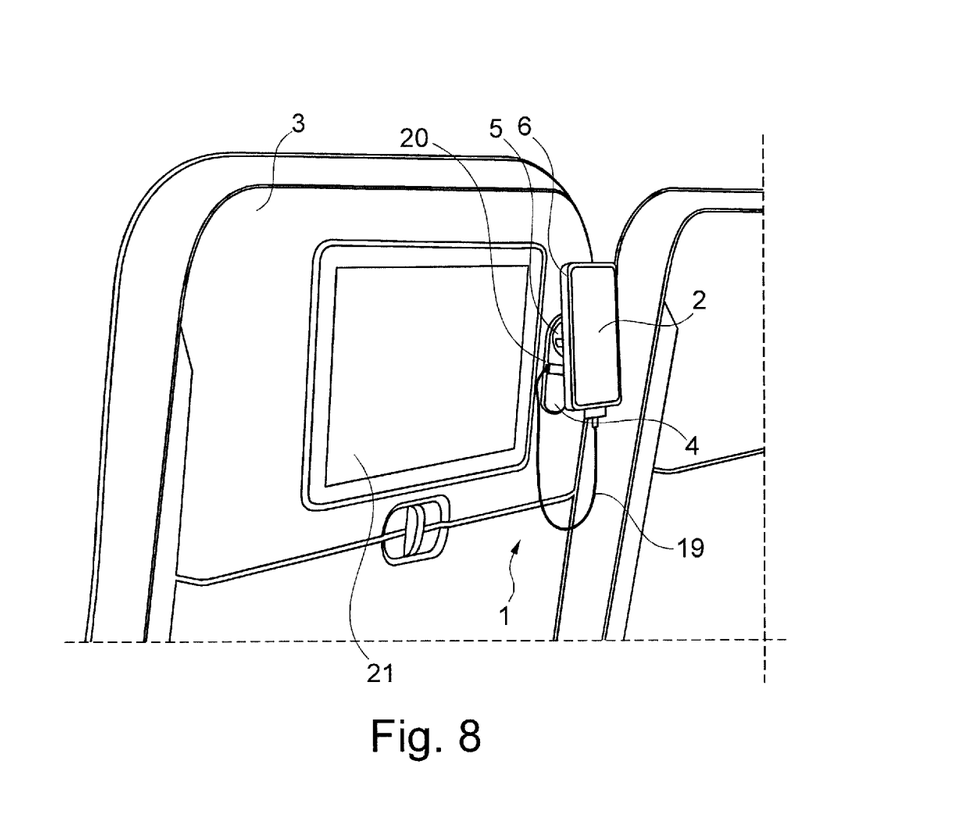
FIG. 8 shows a fastening system on the rear side of an airplane seat.

FIG. 1 shows a holding apparatus 4 with a connecting apparatus 5 of a fastening system 1. The holding apparatus 4 can, for example, be arranged in an airplane seat 3. The fastening system 1 and the airplane seat 3 are shown in FIG. 8, for example. The connecting apparatus 5 is in a use position in FIG. 1. The connecting apparatus 5 can be moved, for example, by being pushed in by the passenger, into a park position into the holding apparatus 4, where the connecting apparatus 5 is advantageously locked.

Figure 2:
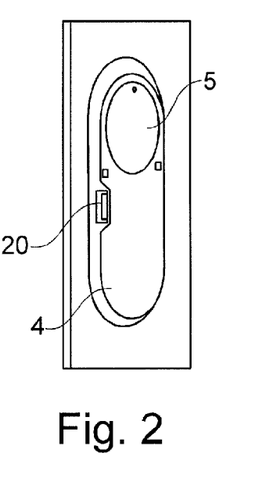
FIG. 2 shows a holding apparatus in a park position.

FIG. 2 shows the same holding apparatus 4, but in this diagram, the connecting apparatus 5 has been moved from the use position in FIG. 1 into a park position. The connecting apparatus 5 is thus recessed in the holding apparatus 4 or in the airplane seat 3 on which the holding apparatus 4 is preferably arranged. The park position in this embodiment can be released by manually pushing on the surface of the connecting apparatus 5, so that the connecting apparatus 5 is or can be moved out of the surface of the holding apparatus 4 and/or moved out manually. In the park position, a uniform surface is encountered in impact of a body, in particular the head, of a passenger in a possible accident, so that injuries due to excessive point loads can be prevented.

Figure 3:
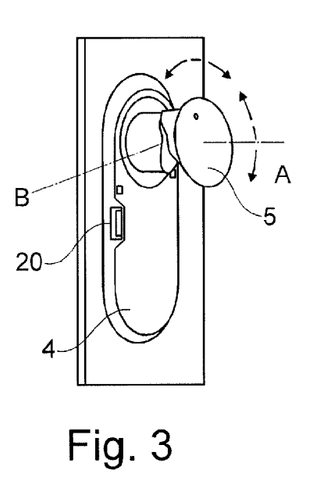
FIG. 3 shows a holding apparatus with a tilted connecting apparatus.
Figure 4:
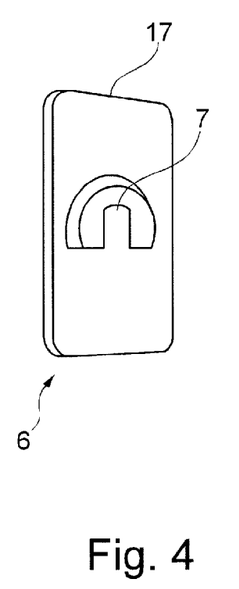
FIG. 4 shows a carrier adapter.
Figure 5:
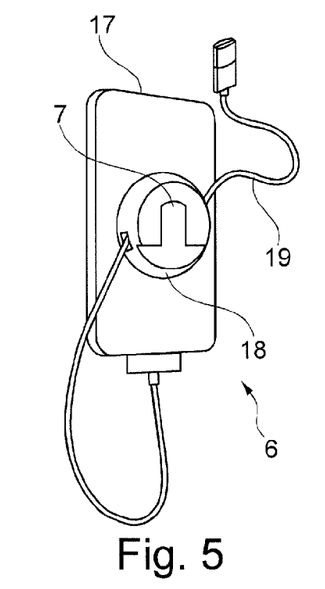
FIG. 5 shows a carrier adapter having a roll-up area for a cable.
Figure 6:
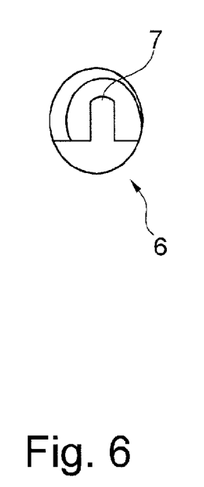
FIG. 6 shows a small carrier adapter.

FIG. 3 shows, in a possible embodiment, in the use position a mobility of the connecting apparatus 5, to which a carrier adapter 6 can be connected in a mechanically load-bearing manner (see FIGS. 4, 5 and 6). The connecting apparatus 5 thus allows rotation of a connected carrier adapter 6. The rotation may be a rotation about an axis A by 90° or by 180°. In addition, the carrier adapter 6 can be tilted by rotation about the axis B. The rotational mechanism in the embodiment of FIG. 3 is integrated into the connecting apparatus 5.

FIG. 4 shows the rear side of a carrier adapter 6 with a connecting device 7. The carrier adapter 6 can be connected to a passenger device 2 in a load-bearing manner so that fastening of the passenger device 2 is possible by means of the carrier adapter 6. In this embodiment, the carrier adapter 6 has a shell 17, which surrounds the passenger device 2 on several sides, not recognizable in this diagram.

In advantageous embodiments, the holding apparatus 4 has a locking device, so that the connection between the connecting apparatus 5 and the connecting device 7 can be released. This release can take place, for example, with the help of a pushbutton 27 (see FIG. 19).

The carrier adapter 6 from FIG. 4 is supplemented in the diagram in FIG. 5 by a roll-up area 18 with which a cable 19, for example, a USB cable, can be rolled up. The cable 19 can thus be connected to the passenger device 2 on one side and on the second side, it can be plugged into a corresponding socket 20, for example, on a holding apparatus 4 (see FIG. 1, 2 or 3) in order to permit a power connection and/or data link for the passenger device. Alternatively, the first side of the cable 19 may have a plug which is integrated into the carrier adapter 6 so that a plug of the cable 19 is inserted into the passenger device 2 in the case of a mechanical connection to the carrier adapter 6.

The diagram in FIG. 6 shows a carrier adapter 6 with a connecting device 7 for mechanical connection or for fastening to the connecting apparatus 5 of the holding apparatus 4. In this embodiment, the carrier adapter 6 may be designed much smaller than a possible passenger device 2. The mechanically load-bearing connection between the carrier adapter 6 and a passenger device 2 (not shown here), for example, a smartphone, can be accomplished by means of an adhesive. The adhesive may first be provided as an adhesive strip on the rear side of the carrier adapter 6 and glued to the rear side of a passenger device 2 as needed after pulling off a protective film.

Figure 7:
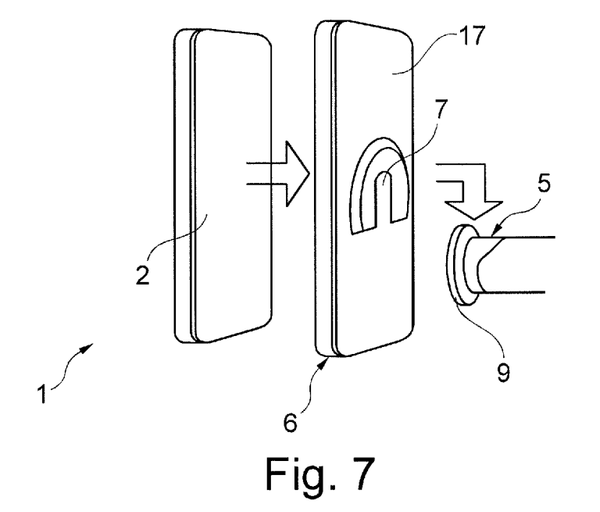
FIG. 7 shows parts of a fastening system.

FIG. 7 shows an embodiment of a fastening system 1 with a passenger device 2 which can be connected to the carrier adapter 6 provided for a certain model of the passenger device 2 in the stamping of a shell 17. The carrier adapter 6 can be connected, together with the passenger device 2, to the connecting apparatus 5 of the holding apparatus 4 (not shown here) by means of the connecting device 7. The connection may initially be accomplished by suspending the suitably shaped connecting device 7 in the connecting apparatus 5. A locking device to prevent unintentional release of the mechanical connection may also be provided but is not shown in this embodiment. In addition, FIG. 7 shows a protrusion 9 at one end of the connecting apparatus 5. This protrusion may be circumferential in the form of a round plate, as in this embodiment.

Removal of the passenger device 2 for hand-guided use or stowage in the baggage is preferably accomplished by releasing the mechanical connection between the connecting apparatus 5 and the connecting device 7, so that the connection between the carrier adapter 6 and the passenger device 2 is preferably maintained. The carrier adapter 6 can function as a protective sleeve for the passenger device 2 in this period of time.

FIG. 8 shows the fastening system 1 described in FIG. 7 on the backrest of an airplane seat 3. The passenger device 2 is connected to the carrier adapter 6 which is in turn connected mechanically to the connecting apparatus 5 which is in the use position. The holding apparatus 4 is integrated into the backrest of the airplane seat 3. The carrier adapter 6 is tilted slightly together with the passenger device 2 so that a good angle of observation of the passenger device 2 can be obtained for the passenger. In addition, a cable 19 establishes a power connection and/or a data link to a socket 20, which is arranged in the holding apparatus 4 in this embodiment. In addition to the fastening system 1, FIG. 8 shows a permanently installed display screen 21 of an on-board entertainment system.

Figure 9:
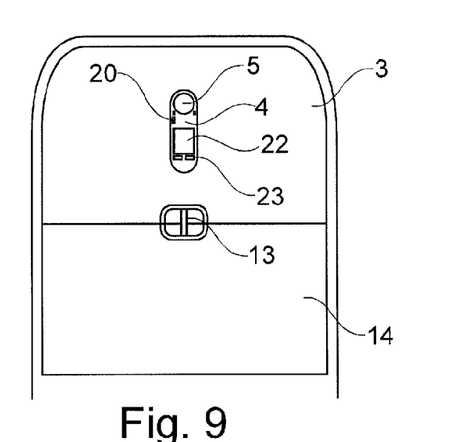
FIG. 9 shows a rear side of an airplane seat with a holding apparatus.

FIG. 9 shows the backrest of an airplane seat 3 with a holding apparatus 4, wherein there is no connection to a passenger device 2 and the park position of the connecting apparatus 5 known from FIG. 2 is established. Such a park position may be assumed, for example, when the airplane is in a critical flight phase so that there is no additional risk of injury due to the holding apparatus 4 in the event of an accident. In addition, the park position can be utilized if the passenger does not carry a passenger device 2 with him or at least would not like to use it temporarily. The holding apparatus 4 from the embodiment shown in FIG. 9 also has a display 22 and operating elements 23 which can be used for various entries by the passenger into on-board systems or for output of information to the passenger.

In addition, the holding apparatus 4 may have a reader which is equipped for wireless communication or wireless readout of RFID tags or RFID transponders and/or passive and/or active transponders for a near field communication (NFC).

Figure 10:
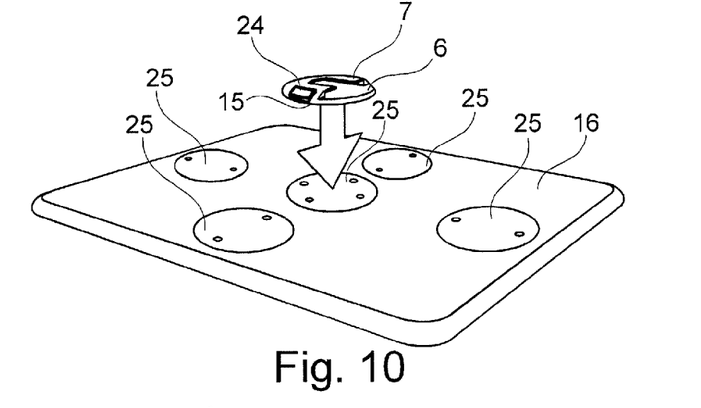
FIG. 10 shows a housing shell and a clipable carrier adapter.

FIG. 10 shows a carrier adapter 6, which has a connecting element 15, namely a clip in this case, which can be released by means of a pushbutton 24. The carrier adapter 6 may be fastened to or securely clipped on various connecting points 25 of a housing shell 16 according to the different possible fastening positions of the carrier adapter 6 on the housing shell 16. The housing shell 16 serves to receive and fasten a passenger device 2, wherein the passenger device in this embodiment is preferably a tablet computer. The various connecting points permit individual positioning of the passenger device using the fastening system 1.

The housing shell 16 and the shell 17 of a carrier adapter 6 may be shaped in a comparable way, but an indirect mechanical connection between a passenger device 2 and the carrier adapter 6 is established by means of the housing shell 16. The housing shell may therefore be a mediating part.

Figure 11:
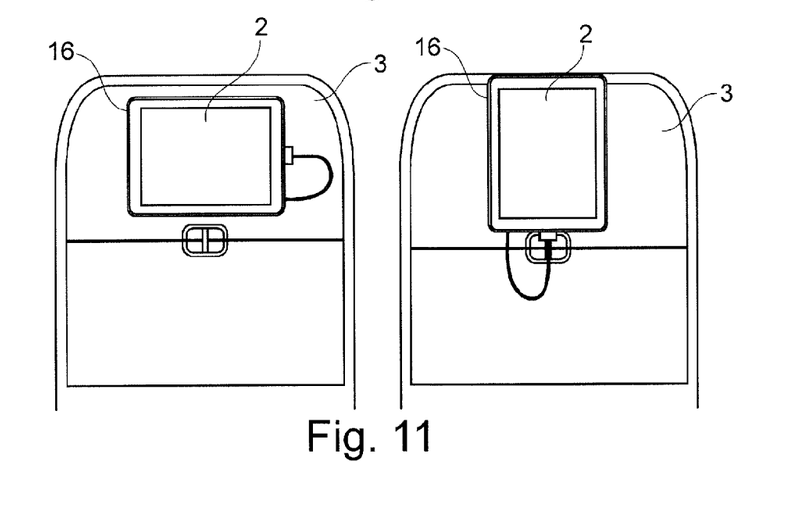
FIG. 11 shows various arrangements of a tablet PC on an airplane seat.

FIG. 11 shows two possible arrangements for a passenger device 2 of the tablet PC type that can be achieved by means of the connecting element 15 on the carrier adapter 6 and the housing shell 16.

Figure 12:
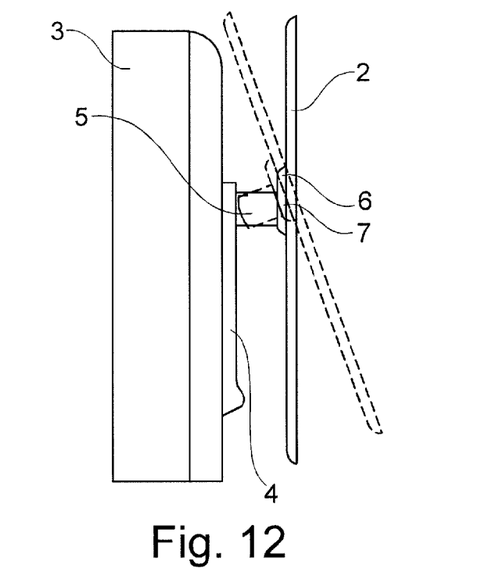
FIG. 12 shows two tilt positions between the holding apparatus and the carrier adapter with a passenger device.

FIG. 12 shows two tilt positions between a holding apparatus 4 and a carrier adapter 6 with passenger device 2, wherein the passenger device 2 is shown with dotted lines in a tilted position. The tilted position can be locked in place with a ball catch in several tilt positions, for example. The lockable tilt positions may be provided, for example, at 0° and/or 20°, as in this advantageous embodiment. It may be advantageous to make an adjustment to the adjustability of the backrest of an airplane seat 3.

Figure 13:
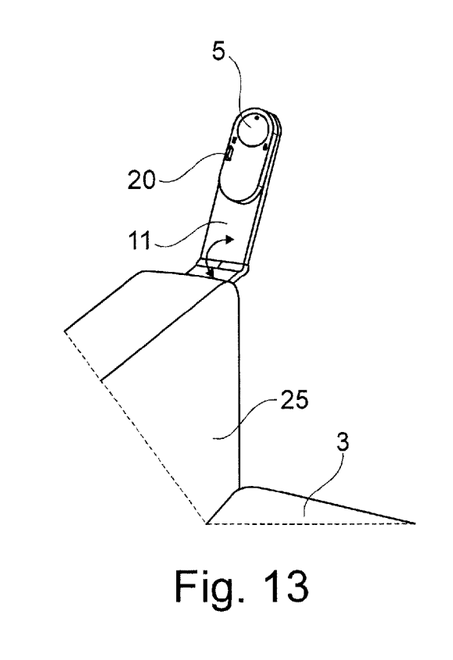
FIG. 13 shows a holding apparatus on a holding arm.

An alternative installation site for the holding apparatus 4 is shown in FIG. 13, where the holding apparatus 4 is arranged on an armrest 25 of an airplane seat 3. This is advantageous if an installation of the holding apparatus on a backrest of a front seat is impossible or is not appropriate, for example, because of the distance.

In this embodiment, the holding apparatus 4 is arranged on a holding arm 11 which establishes the connection to the airplane seat 3. The holding arm 11 is advantageously foldable, so that it can be moved into various positions. These positions may differ in their usability and safety in the event of an accident. The holding arm 11 can be extracted out of the airplane seat 3 and/or extended. In a possible embodiment, the holding arm 11 may have at least one rotatable part. Furthermore, the position or arrangement of the holding arm 11 or of the holding apparatus 4 can be selected in advantageous embodiments in such a way that, when there is a change in the backrest position of the front seat, no contact can occur between the front seat and the holding arm 11, the holding apparatus 4, the carrier adapter 6 and/or the passenger device 2.

Figure 14:
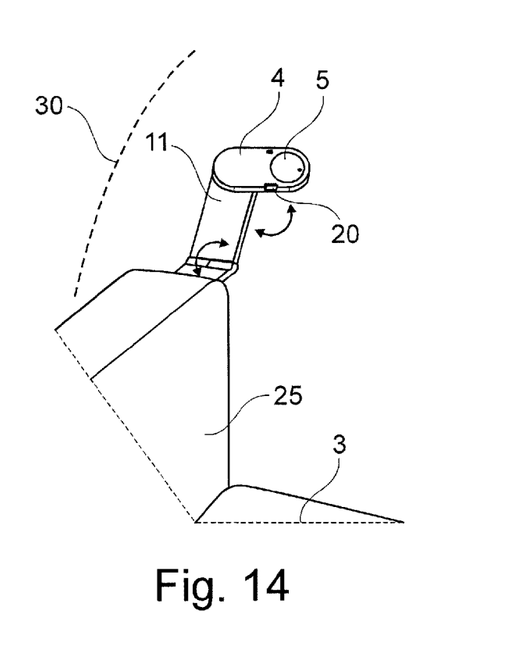
FIG. 14 shows a rotatable holding apparatus on a holding arm.

In a possible embodiment, FIG. 14 shows a foldable holding arm 11, wherein the holding apparatus 4 is rotated laterally by 90° in this embodiment. The holding apparatus 4 can be locked in this rotated position. Due to the rotation of the holding apparatus 4, which may also be implemented by the folding arm 11 in an alternative embodiment, an arrangement of larger passenger devices 2 on the holding apparatus 4 can be made possible. This is advantageous in particular when the airplane seat 3 is a seat by a wall 30, for example, a curved cabin wall.

Figure 15:
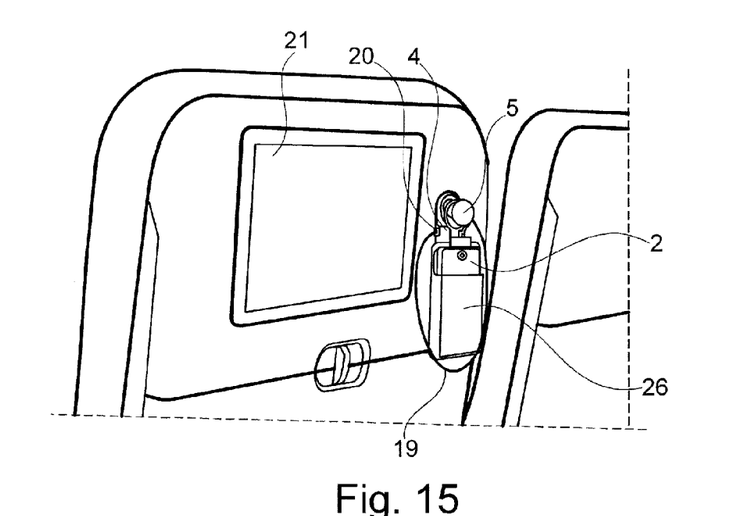
FIG. 15 shows a passenger device on a bag on an airplane seat.

FIG. 15 shows another possible use of the connecting apparatus 5, wherein a passenger device 2 is held by means of a bag 26 with a corresponding loop. In this possible use, the passenger device 2 can be used by the passenger only to a limited extent due to the bag 26, but it can be charged by means of the cable 19, for example, and/or used for listening to music. In addition, it can be stored near the passenger within reach, independently of a table.

Figure 16:
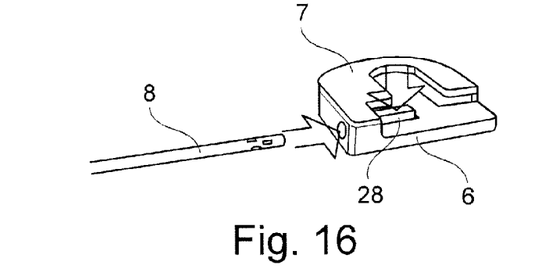
FIG. 16 shows a locking device with an extraction tool.

FIG. 16 shows a releasable locking device arranged on the connecting device 7, permitting a releasable mechanical connection between the connecting device 7 and a connecting apparatus 5. The locking may be accomplished, for example, with a displaceable blocking element 28. Such a blocking element 28 can be moved by means of a pushbutton 27 (see FIG. 19), for example. In the embodiment shown in FIG. 16, the blocking element 28 of the locking device can be released only by using an extraction tool 8, so that mainly only the service personnel of the airline company that have this tool at their disposal can release the connection between the connecting device 7 and the connecting apparatus 5. In this embodiment, the connection typically cannot be released by the passenger.

In alternative embodiments, the locking device can be released in an electronically controlled manner, for example, by a corresponding servo-mechanical control. A corresponding control signal can be sent centrally in the airplane over a corresponding data network or by identification of a certain RFID identifier on the holding apparatus 4 by means of the reader. Again in these embodiments, the releasing operation of the mechanical connection can preferably be triggered only by the service personnel using a suitable transponder so that in the event of possible issuance of electronic devices in the cabin by the airline company, these devices cannot be removed from their installation site without hindrance.

In another possible embodiment, the connecting apparatus 5 can be locked electronically in the park position in the holding apparatus 4, so that a locking and/or unlocking controlled centrally in the airplane can take place. In this way, use of the fastening system 1 can be prevented for the passengers until reaching a safe flying altitude after takeoff, so that suppression of use in this critical phase of flight would be easy to implement. In another possible embodiment, there may be a clear message when, of all the holding apparatuses 4 installed in the airplane, the connecting apparatuses 5 are in a park position.

Figure 17:
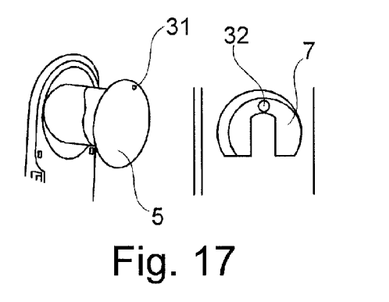
FIG. 17 shows a locking device without an extraction tool.

FIG. 17 shows another embodiment of a locking device, wherein the locking apparatus has a spring-mounted ball 31 on the connecting apparatus 5 and has a corresponding depression 32 on the respective connecting device 7 of a carrier adapter 6. When connected, the ball 31 and the depression 32 engage with one another in a form-fitting manner, so that the connection between the connecting device 7 and the connecting apparatus 5 cannot be released unintentionally, for example, during turbulence during a flight or when rotating the carrier adapter 6.

Such a locking device may be, for example, a ball bearing locking mechanism, i.e., for example, a spring-mounted and/or rotatably mounted ball, or a mechanical locking mechanism, having a spring-mounted locking part in particular. One part of the locking device, for example, the spring-mounted and/or rotatable ball may be arranged in the connecting apparatus. A corresponding part of the locking device may be provided as a counterpart, for example, in the form of a depression, in which the connecting device of the carrier adapter is provided.

Figure 18:
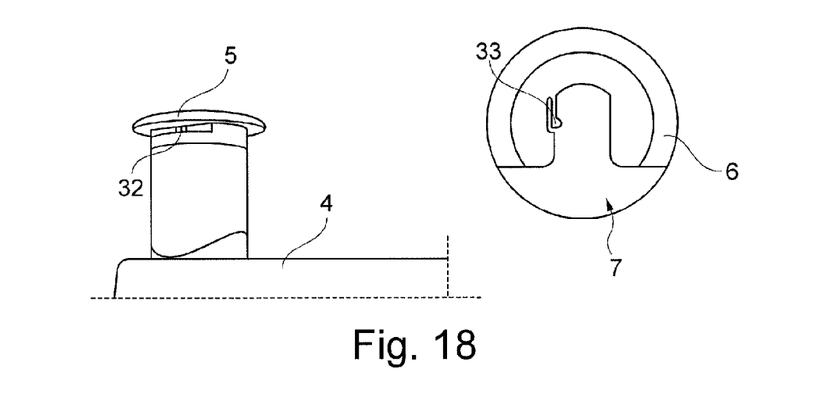
FIG. 18 shows a locking device with a clip mechanism.

FIG. 18 shows an advantageous locking device having a clip mechanism, which causes a releasable connection between the connecting apparatus 5 and the connecting device 7. The connecting device 7 of the carrier adapter 6 has a catch 33 or a spring clamp or a clip. In this embodiment, the connecting apparatus 5 has a corresponding depression 32 with a corresponding shape for engagement. In an alternative embodiment, the catch 33 may also be assigned to the connecting apparatus 5, and the depression 32 may be assigned to the connecting device 7.

Figure 19:
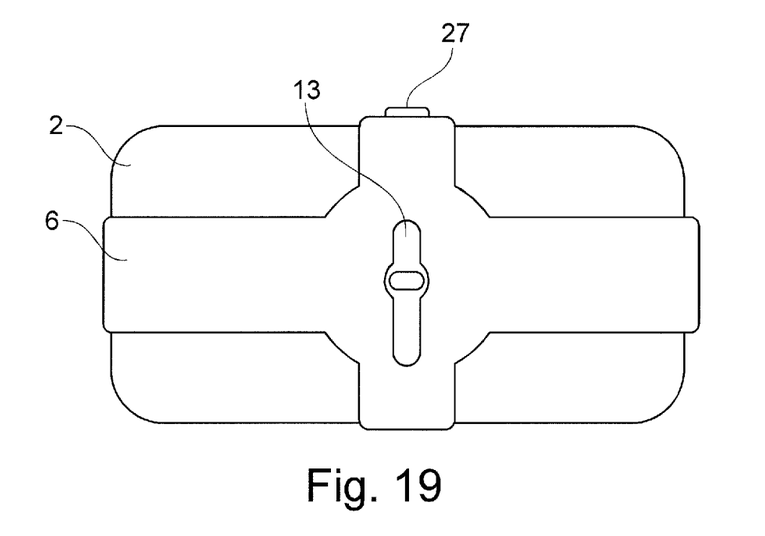
FIG. 19 shows a carrier adapter for a passenger device on a locking lever.

FIG. 19 shows a carrier adapter 6 with a passenger device 2 held in it. The carrier adapter 6 and the passenger device 2 are shown in this diagram in a view from the rear. In this embodiment, the carrier adapter 6 is provided for being fastened to a locking lever 13 of a folding table 14 on the rear side of an airplane seat 3. The airplane seat 3 is not shown in this embodiment.

Figure 20:
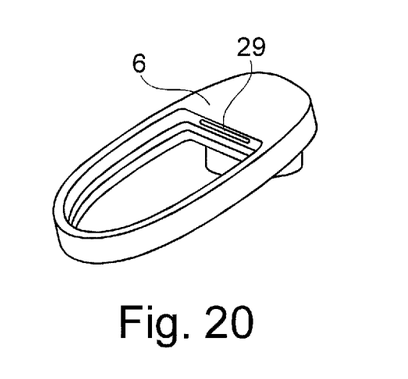
FIG. 20 shows a carrier adapter with an elastic ring.

In addition, FIG. 20 shows a carrier adapter, which has an elastic ring made of silicone, for example. The passenger device 2 can be inserted into the elastic ring, wherein the passenger device can be secured due to the elastic property of the elastic ring and/or it has tension means in the elastic ring, so that the passenger device can be clamped securely in the elastic ring. In a possible embodiment, the carrier adapter 6 may have a built-in plug-in location 29, which is equipped to establish a plug connection to a connecting port of a passenger device 2 on receiving a passenger device 2 by the carrier adapter 6.

The invention claimed is:

1. A fastening system for passenger devices in an airplane, comprising:
 a holding apparatus,
 wherein the holding apparatus is configured to be mounted in or on an airplane seat, and
 wherein the holding apparatus comprises:
  a connecting apparatus,
  wherein the connecting apparatus is displaceable between a park position and a use position;
  a portable carrier adapter,
  wherein the portable carrier adapter has a connecting device,
  wherein when the connecting apparatus is in the use position, the connecting apparatus and the connecting device are releasably connectable to one another in a mechanically load-bearing manner,
  wherein when the connecting apparatus is in the park position, the connecting apparatus and the connecting device are not connectable,
  wherein the portable carrier adapter is equipped to be connected to a passenger device in a mechanically load-bearing manner; and
  an NFC reader; and
  a releasable locking device,
  wherein the releasable locking device releasably locks the connecting apparatus and the connecting device together.

2. The fastening system according to claim 1,
wherein when the holding apparatus is mounted in or on the airplane seat and the connecting apparatus is in the park position, the connecting apparatus is recessed in the airplane seat.

3. The fastening system according to claim 1,
wherein the carrier adapter is:
(i) rotatable with respect to the holding apparatus about a first axis,
(ii) tiltable about a second axis, or
(iii) rotatable with respect to the holding apparatus about the first axis and tiltable about the second axis,
when the connecting apparatus and the connecting device are connected to one another in the mechanically load-bearing manner in the use position.

4. The fastening system according to claim 1,
wherein the releasable locking device locks the connecting apparatus and the connecting device together via a mechanical connection between the connecting device and the connecting apparatus, and
wherein the releasable locking device releases exclusively by an extraction tool.

5. The fastening system according to claim 1,
wherein the holding apparatus further comprises:
an RFID reader.

6. The fastening system according to claim 1,
wherein the holding apparatus is configured to be arranged on an armrest of the airplane seat,
wherein the fastening system comprises a holding arm, and
wherein the holding arm is connected at one end to the airplane seat and on whose other end the holding apparatus is mounted.

7. The fastening system according to claim 1,
wherein the releasable locking device locks the connecting apparatus and the connecting device together via a mechanical connection between the connecting device and the connecting apparatus, and
wherein the releasable locking device releases in an electronically controlled manner.

8. The fastening system according to claim 7,
wherein the holding apparatus further comprises an RFID reader, and
wherein the mechanical connection between the connecting device and the connecting apparatus releases in an electronically controlled manner by way of:
(i) the RFID reader,
(ii) the NFC reader, or
(iii) the RFID reader and the NFC reader.

9. A holding apparatus for a passenger device in an airplane,
wherein the holding apparatus is configured to be mounted in or on an airplane seat, and
wherein the holding apparatus comprises:
 a connecting apparatus,
 wherein the connecting apparatus is displaceable between a park position and a use position,
 wherein when the connecting apparatus is in the use position, the connecting apparatus is configured to releasably connect to a connecting device of a portable carrier adapter such that the connecting apparatus and the connecting device releasably connect to one another in a mechanically load-bearing manner,
 wherein when the connecting apparatus is in the park position, the connecting apparatus and the connecting device are not connectable, and wherein the portable carrier adapter is equipped to be connected to the passenger device in a load-bearing manner;
an NFC reader; and
a releasable locking device,
wherein the releasable locking device releasably locks the connecting apparatus and the connecting device together.

10. The holding apparatus according to claim 9, wherein when the connecting apparatus is in the park position, the connecting apparatus is recessed.

11. The holding apparatus according to claim 9, wherein the connecting apparatus has a protrusion on one end.

12. The holding apparatus according to claim 9, wherein the holding apparatus is configured to be arranged on an armrest of the airplane seat.

13. The holding apparatus according to claim 9, wherein the holding apparatus is configured to be arranged on a rear side of an airplane seat.

14. A portable carrier adapter for a passenger device in an airplane, comprising:
a connecting device,
wherein the portable carrier adapter is equipped to be connected to a passenger device in a mechanically load-bearing manner,
wherein the connecting device is configured to releasably connect to a connecting apparatus of a holding apparatus such that the connecting device and the connecting apparatus releasably connect to one another in a mechanically load-bearing manner, when the connecting apparatus is in a use position,
wherein the holding apparatus is equipped for connection in or on an airplane seat, and
wherein the holding device comprises an NFC reader,
wherein the connecting apparatus is displaceable between a park position and the use position,
wherein when the connecting apparatus is in the park position, the connecting apparatus and the connecting device are not connectable; and
wherein the holding device comprises a releasable locking device,
wherein the releasable locking device releasably locks the connecting apparatus and the connecting device together.

15. The portable carrier adapter according to claim 14, further comprising:
an adhesive,
wherein the adhesive is configured to connect to one side of a mobile passenger device.

16. The portable carrier adapter according to claim 14, further comprising:
a connecting element,
wherein the connecting element is configured to connect to a housing shell for a mobile passenger device.

17. The portable carrier adapter according to claim 14, further comprising:
a shell,
wherein the shell is configured to accommodate a mobile passenger device in the shell.

18. The portable carrier adapter according to claim 14, wherein the portable carrier adapter comprises a roll-up area for at least one cable.

* * * * *